United States Patent
Yamada et al.

[11] Patent Number: 6,123,379
[45] Date of Patent: Sep. 26, 2000

[54] LOCKING MECHANISM FOR VEHICLES

[75] Inventors: Yukifumi Yamada, Toyota; Naoaki Hoshihara, Aichi-ken; Kenichi Kazaoka, Nagoya, all of Japan

[73] Assignee: Aisin Seiki Kabushiki Kaisha, Kariya, Japan

[21] Appl. No.: 09/237,223

[22] Filed: Jan. 26, 1999

[30] Foreign Application Priority Data

Jan. 27, 1998 [JP] Japan .................................. 10-014324

[51] Int. Cl.[7] .................................................. B60N 2/08
[52] U.S. Cl. ...................................... 296/65.03; 297/351
[58] Field of Search .................................. 296/63, 65.03, 296/65.01, 65.05, 65.08, 65.09; 297/336, 331; 292/216, DIG. 43

[56] References Cited

U.S. PATENT DOCUMENTS

| | | |
|---|---|---|
| 3,719,379 | 3/1973 | Sigmund . |
| 4,770,459 | 9/1988 | Nakaiwa et al. ............................ 296/65 |
| 4,929,007 | 5/1990 | Bartczak et al. ...................... 292/336.3 |
| 5,169,186 | 12/1992 | Fukumoto et al. ...................... 292/201 |
| 5,626,391 | 5/1997 | Miller et al. ......................... 296/65.1 X |
| 5,634,686 | 6/1997 | Okazaki ............................. 296/65.1 X |
| 6,012,747 | 1/2000 | Takamura et al. ....................... 292/216 |

FOREIGN PATENT DOCUMENTS

| | | |
|---|---|---|
| 1 801 154 | 7/1970 | Germany . |
| 196 28 985 | 10/1997 | Germany . |
| 5-58453 | 8/1993 | Japan . |

*Primary Examiner*—D. Glenn Dayoan
*Assistant Examiner*—Jason Morrow
*Attorney, Agent, or Firm*—Burns, Doane, Swecker & Mathis, LLP

[57] ABSTRACT

A locking mechanism used in a vehicle for locking and unlocking a movable structure to a fixed structure includes a base plate secured on the movable structure, a striker secured on the fixed structure, a latch rotatably supported on the base plate to engage the striker, and a pawl rotatably supported on the base plate to maintain engagement between the striker and the latch. A cam member is rotatably supported on the base plate to pinch the striker together with the latch.

16 Claims, 7 Drawing Sheets

LOCKING MECHANISM FOR VEHICLES

This application corresponds to and claims priority under 35 U.S.C. § 119 with respect to Japanese Application No. 10(1998)-14324 filed on Jan. 26, 1998, the entire content of which is incorporated herein by reference.

FIELD OF THE INVENTION

The present invention generally relates to locking mechanisms. More particularly, the present invention pertains to a locking mechanism useful in a variety of contexts in an automotive vehicle, including as a seat locking mechanism for holding a seat cushion of the vehicle to the vehicle floor, as a door locking mechanism for holding a door of vehicle to a body of vehicle, and as a lid locking mechanism for holding different types of lids (for example an engine lid or hood, a luggage compartment lid, a fuel lid, etc.) to the vehicle body.

BACKGROUND OF THE INVENTION

Unexamined Published Japanese Utility Model Application (Kokai) No. Hei 5-58453 discloses a conventional vehicle locking mechanism that includes a striker secured on the floor of the vehicle (a fixed member), a base plate secured on a seat cushion of the vehicle (a movable member) and provided with a receiving groove for receiving the striker, a latch rotatably supported on the base plate to engage the striker together with the receiving groove, and a pawl rotatably supported on the base plate to maintain the engagement between the striker, the latch and the receiving groove. In addition, a spring is disposed between the latch and the pawl to rotate the pawl in the engagement direction with the latch and to rotate the latch in the disengagement direction from the striker. The striker is inserted into the receiving groove and rotates the latch against the urging force of the spring to engage the receiving groove and the latch. Further, the urging force of the spring rotates the pawl to engage with the latch so that the latch is restricted from rotating by the pawl. The locking mechanism thus holds the seat cushion to the floor.

However, in this known type of locking mechanism, because the engagement and disengagement between the latch and the striker, and the engagement and disengagement between the latch and the pawl are designed to be smooth, there are predetermined gaps at both of the engagement portions. Thus, when the locking mechanism holds the seat cushion to the floor of the vehicle, the latch can rotate according to the rotational play which exists by virtue of the gaps. Thus, play in the seat cushion arises.

In light of the foregoing, a need exists for a locking mechanism that is not susceptible to the same disadvantages and drawbacks as other known locking mechanisms such as described above.

It would be desirable to provide a locking mechanism which does not create play.

SUMMARY OF THE INVENTION

One aspect of the present invention involves a vehicle seat provided with a seat locking mechanism for locking and unlocking the seat cushion with respect to the floor of the vehicle. The vehicle seat includes a base plate secured on the seat cushion, a striker secured to the fixed member, and a latch rotatably supported on the base plate to engage the striker, with the latch including an engaging portion. A pawl is rotatably supported on the base plate and includes an engaging portion adapted to engage the engaging portion of the latch to maintain engagement between the striker and the latch to effect a locked condition of the locking mechanism. A cam member is rotatably supported on the base plate to pinch the striker together with the latch in the locked condition of the locking mechanism.

Another aspect of the present invention includes a locking mechanism for use in vehicles to hold a movable member to a fixed member. The locking mechanism includes a base plate secured on the movable member, a striker secured on the fixed member, a latch rotatably supported on the base plate to engage the striker, a pawl rotatably supported on the base plate to maintain engagement between the striker and the latch, and a cam member rotatably supported on the base plate to pinch the striker together with the latch.

A further aspect of the present invention involves a locking mechanism for use in vehicles to lock and unlock a movable member with respect to a fixed member. The locking mechanism includes a base plate secured on the movable member, a striker secured on the fixed member, a latch rotatably supported on the base plate to rotate and engage the striker in response to movement between the movable member and the fixed member, a pawl rotatably supported on the base plate to engage the latch for restricting rotation of the latch, and a cam member rotatably supported on the base plate to push the striker for engaging with the latch.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
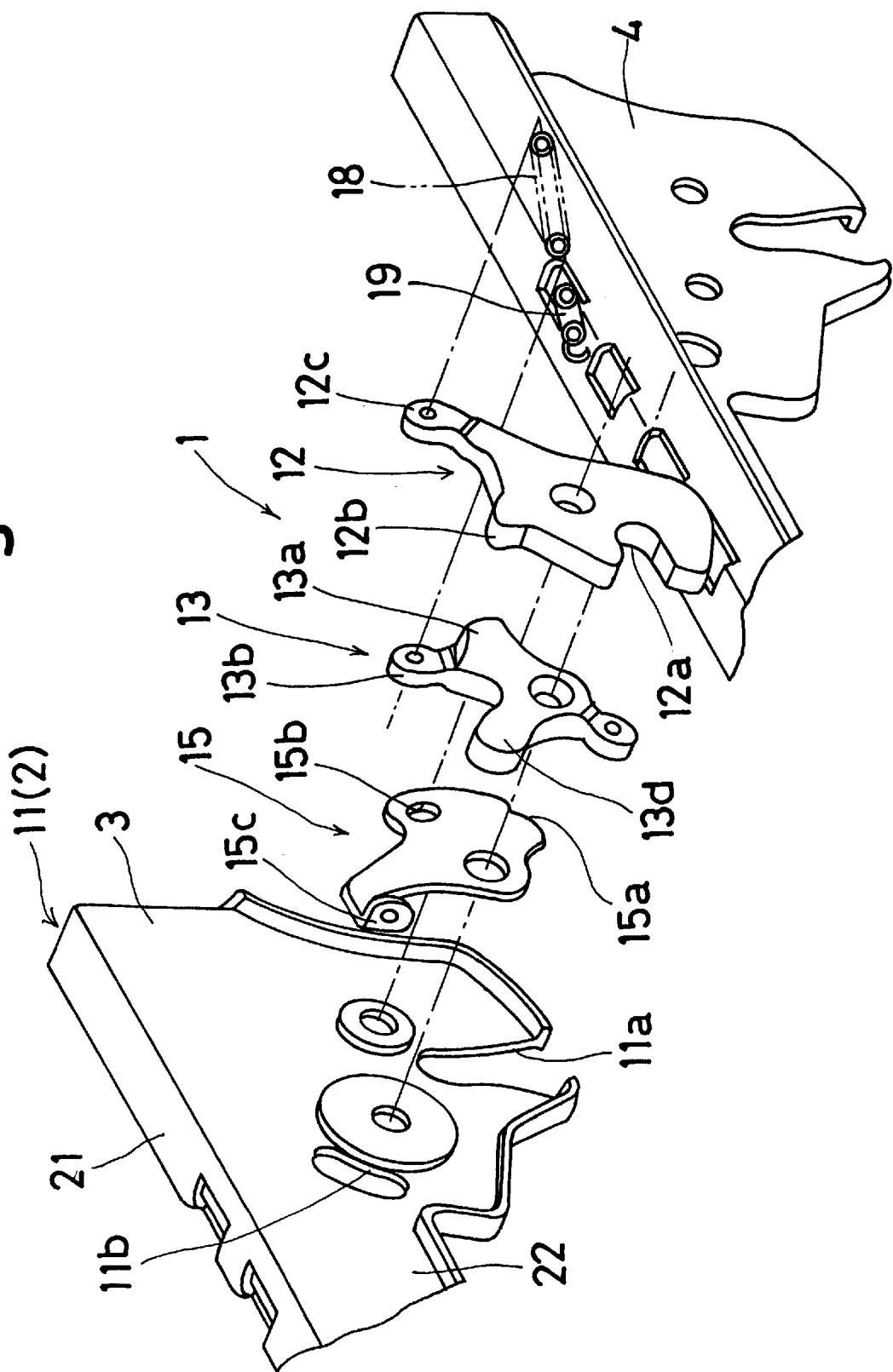
FIG. 1 is an exploded perspective view of a locking mechanism useful in vehicles in accordance with the present invention.

The locking mechanism according to the present invention can be used in a variety of contexts in a vehicle. FIGS. 1–4 illustrate the locking mechanism 1 as being used in connection with a vehicle seat ST to lock the seat to the vehicle floor. The locking mechanism 1 is located between the back end or rear end of a vehicle seat cushion S and the floor F of the vehicle to hold the seat cushion S to the floor F. The seat cushion S forms a movable member while the vehicle floor F constitutes a fixed member.

The locking mechanism 1 includes a base plate 11, a latch 12, a pawl 13, a striker 14, and a cam plate 15. The front end of the seat cushion S is rotatably supported on the vehicle floor F by a hinge mechanism so that the seat cushion S can rotate during the disengaging operation of the vehicle locking mechanism 1. The seat cushion S is thus positionable in two states. One state is a sitting state in which the seat cushion S is oriented horizontal with respect to the floor F and the other state is a storage state in which the seat cushion S is oriented vertical with respect to the floor F.

Figure 3:
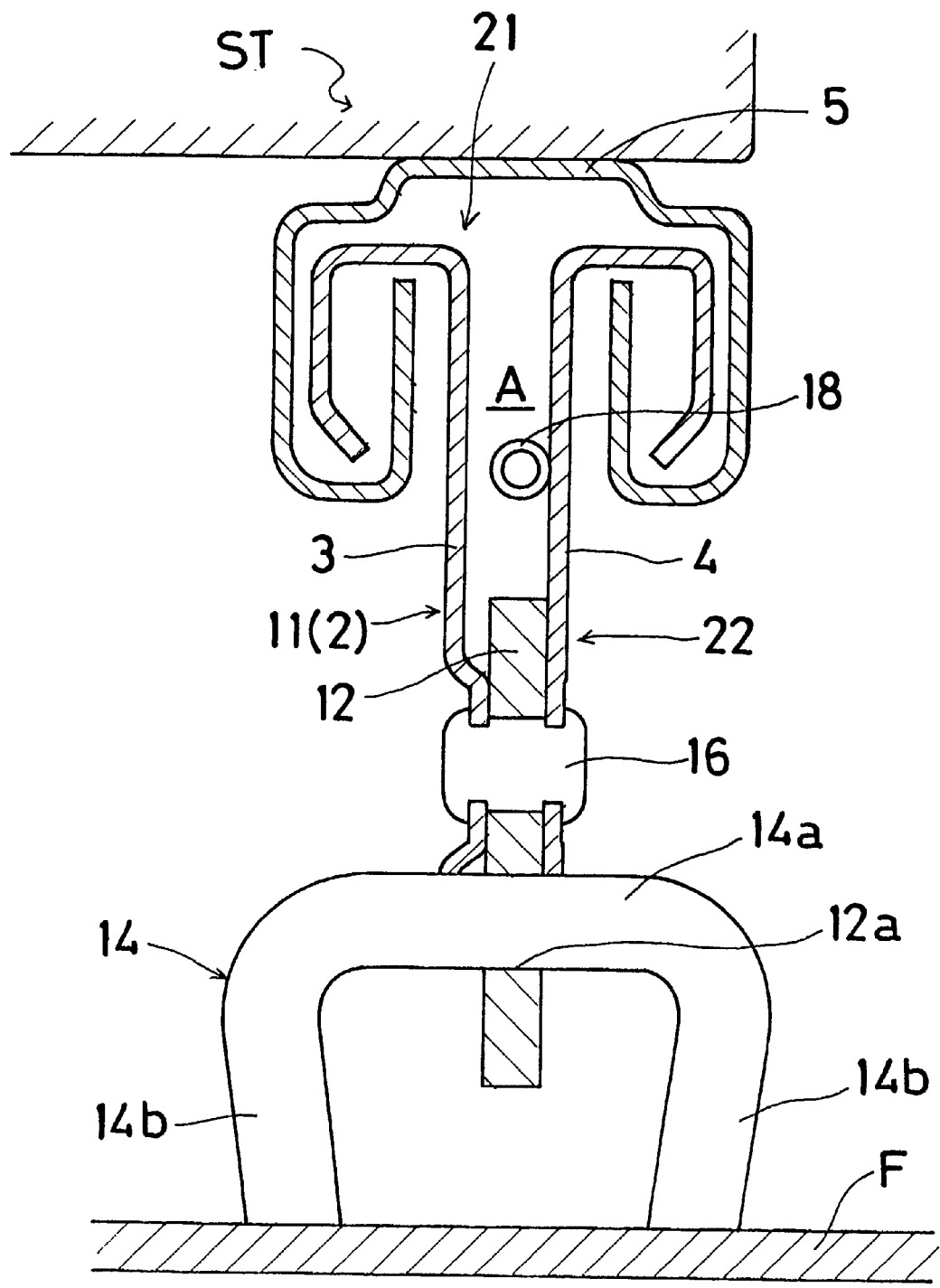
FIG. 3 is a cross-sectional view taken along the section line III—III in FIG. 2.
Figure 4:
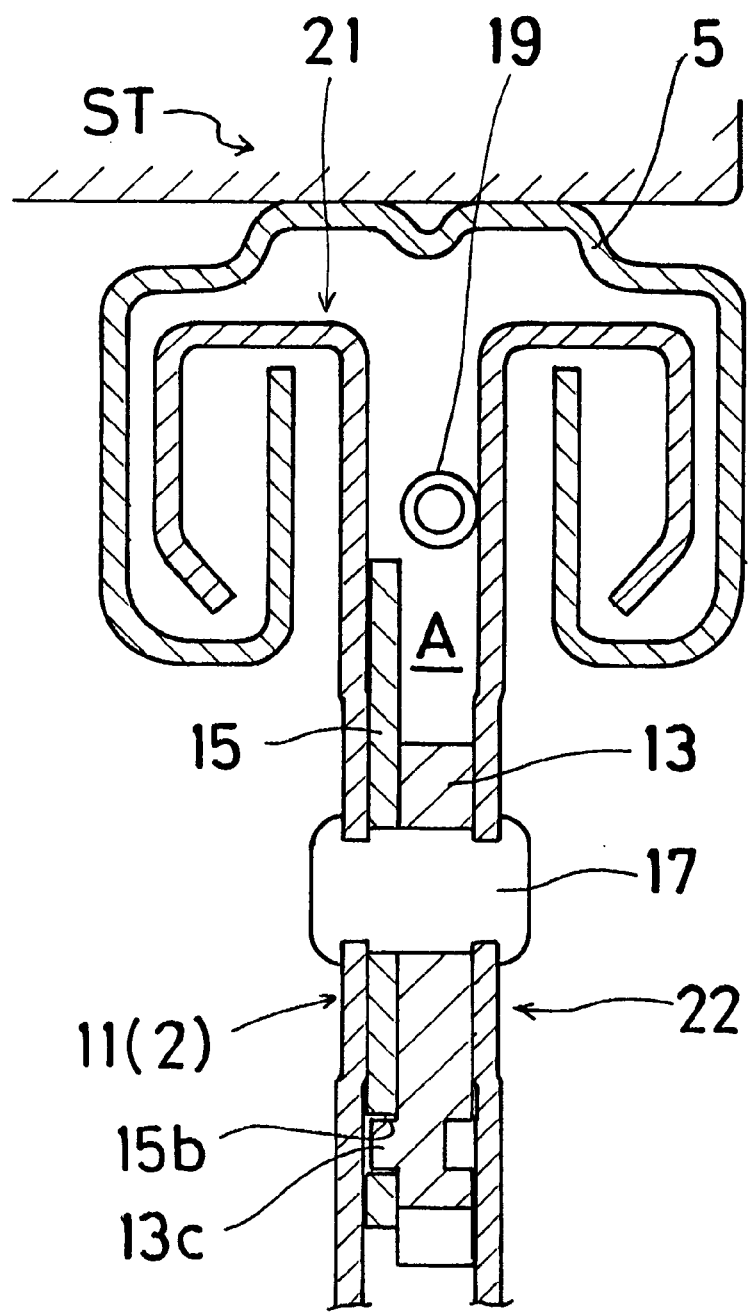
FIG. 4 is a cross-sectional view taken along the section line IV—IV in FIG. 2.

The base plate 11 forms a part of a lower rail 2 which constitutes a portion of a seat sliding mechanism that allows the seat cushion S to slide in the forward direction and the rearward direction. As shown in FIG. 3, the base plate 11 consists of two pressed plates 3, 4 forming an inverted T-shape part that includes a horizontal portion 21 and a vertical portion 22. The seat sliding mechanism also includes an upper rail 5 that is fixed to the seat cushion S. The upper rail 5 possesses an inverted U-shape configuration and slidably surrounds the horizontal portion 21 of the lower rail 2 or base plate 11.

Figure 2:
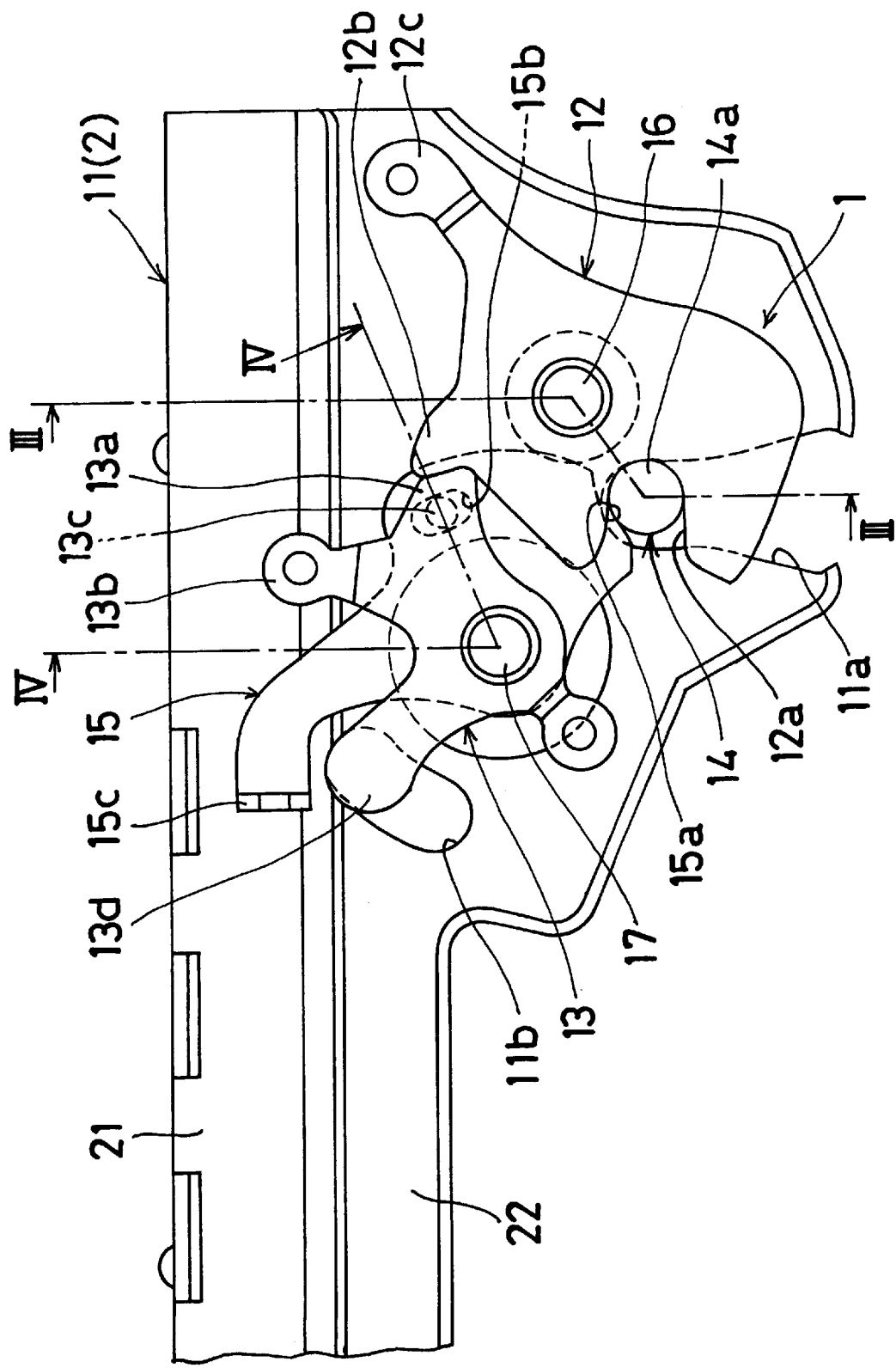
FIG. 2 is a front view of the locking mechanism shown in FIG. 1 illustrating the engaging or locking state of the locking mechanism.

The base plate 11 further includes a space A which is located between the pressed plates 3, 4 as shown in FIG. 3, and a U-shaped groove 11a which opens downward toward the lower direction of the base plate 11 as best seen in FIGS. 1 and 2. The latch 12 is located within the space A and is rotatably supported on the base plate 11 by a latch pin 16. The pawl 13 is also located within the space A and is rotatably supported on the base plate 11 by a pawl pin 17. The axis of the pawl pin 17 is spaced apart from the axis of the latch pin 16, with the U-shaped groove 11a being located between the pawl pin 17 and the latch pin 16 as shown in FIG. 2.

The striker 14 possesses an inverted U-shaped configuration as seen in FIG. 3, and includes a horizontal portion 14a and a pair of vertical portions 14b. Each of the vertical portions extends from the horizontal portion 14a. The lower or bottom end of each of the vertical portions 14b of the striker 14 is fixed to the floor F of the vehicle.

Figure 5:
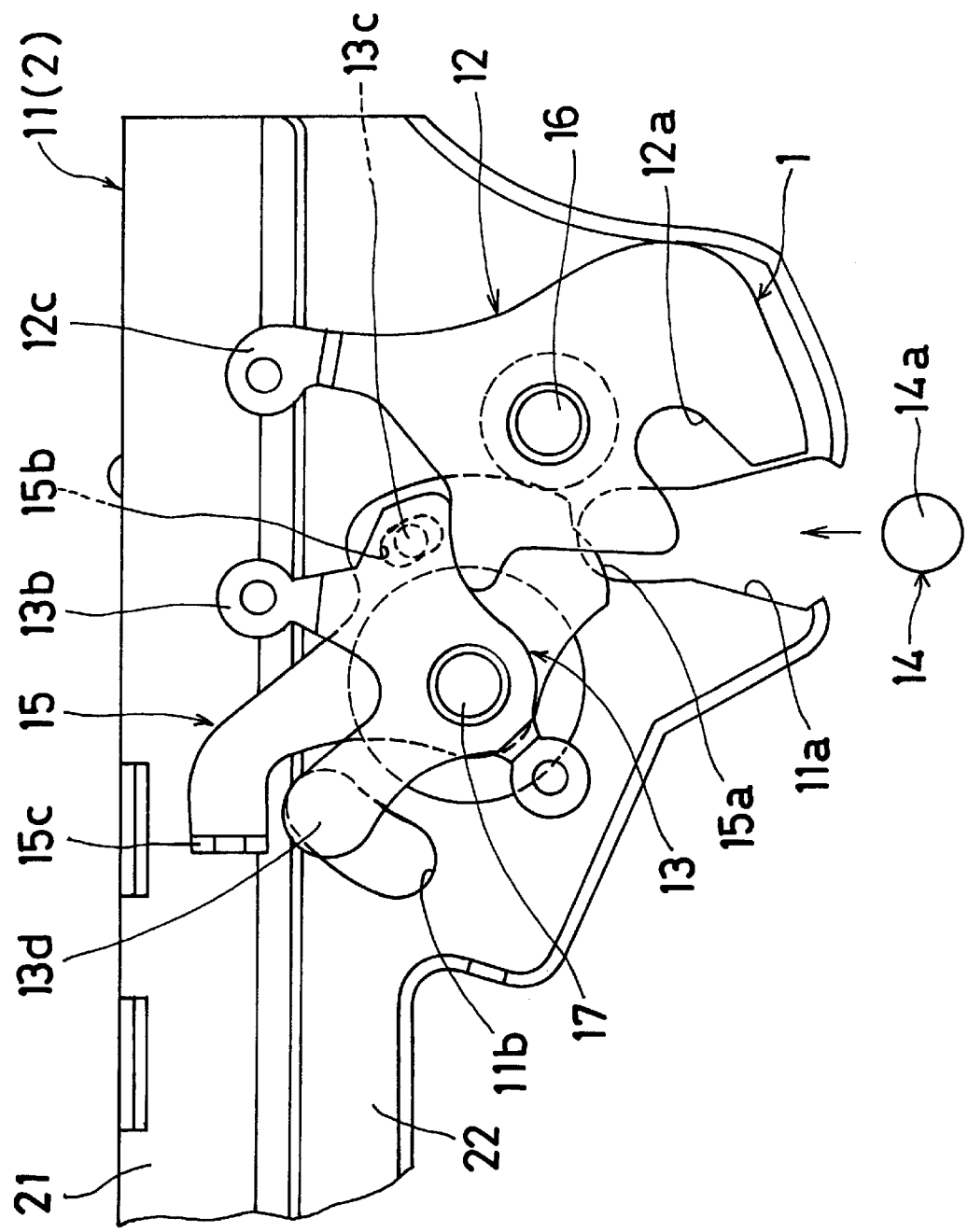
FIG. 5 is a front view of the locking mechanism showing the disengaging state of the locking mechanism.

The latch 12 includes a U-shape groove 12a which opens toward the outer circumference of the latch 12. The latch 12 is rotatable to change the position of the U-shaped groove 12a from an opening position with respect to the U-shaped groove 11a of the base plate 11 as shown in FIG. 5 and a closing position with respect to the U-shaped groove 11a of the base plate 11 as shown in FIG. 2. In the opening position, the striker 14 is able to enter the U-shaped groove 11a of the base plate 11. In the closing position, the striker is retained within the U-shaped groove 11a of the base plate 11 by the latch 12.

The pawl 13 includes a connecting or engaging portion 13a which is adapted to engage a connecting or engaging portion 12b of the latch 12 to restrict the latch 12 from rotating. The diameter of the horizontal portion 14a of the striker 14 is smaller than the width of the U-shape groove 11a of the base plate 11, and is generally the same as the diameter of the U-shape groove 12a of the latch 12. Therefore, the horizontal portion 14a of the striker 14 can be inserted into the U-shaped groove 12a of the latch 12, and can be engaged with the U-shaped groove 12a.

The base plate 11 further includes a slit 11b positioned slightly above the hole in the base plate 11 that receives the pawl pin 17. The slit 11b is adapted to receive an arm pin 13d extending from the pawl 13. The slit 11b is arcuate and forms a part of an arc whose center is the axis of the pawl pin 17. Accordingly, the arm pin 13d of the pawl 13 is guided by the slit 11b, with the rotational angle of the pawl 13 being restricted by the confines of the slit 11b.

A coil spring 18 is located between the latch 12 and the pawl 13. One end of the spring 18 is connected with a connecting portion 12c of the latch 12 and the other end of the spring 18 is connected with a connecting portion 13b of the pawl 13. The spring 18 always urges the latch 12 to rotate in the counter-clockwise direction as seen with reference to FIG. 2 to disengage the latch 12 and the striker 14 when the latch 12 is free to rotate. The spring 18 further urges the pawl 13 to rotate in the clockwise direction as seen with reference to FIG. 2 to engage the connecting or engaging portion 13a of the pawl 13 and the connecting or engaging portion 12b of the latch 12.

The cam plate 15 is also rotatably supported on the base plate 11 by the pawl pin 17. The cam plate 15 is adapted to rotate relative to the pawl 13. The cam plate 15 includes a cam surface 15a which is adapted to hold the horizontal portion 14a of the striker 14 against the U-shape groove 12a of the latch 12. The cam plate 15 also includes a slit 15b which is adapted to receive a connecting pin 13c of the pawl 13. The slit 15b is arcuate in shape and forms a part of an arc whose center is the axis of the pawl pin 17. The cam plate 15 is able to rotate relative to the pawl 13 as determined by the lengthwise extent of the slit 15b. When the connecting pin 13c on the pawl 13 contacts the end portion of the slit 15b, the cam plate 15 integrally rotates with the pawl 13.

A coil spring 19 is located between the cam plate 15 and the pawl 13. One end of the spring 19 is connected with a connecting portion 15c of the cam plate 15 and the other end of the spring 19 is connected with a connecting portion 13b of the pawl 13. The spring 19 applies a continuous urging force to the cam plate 15 which urges the cam plate 15 to rotate in the clockwise direction as seen with reference to FIG. 2 relative to the pawl 13. The coil spring 19 that is located between the cam plate 15 and the pawl 13 constitutes a first spring while the coil spring 18 that is located between the latch 12 and the pawl 13 constitutes a second spring. The urging force of the first spring 19 is smaller than that of the second spring 18 so that the pawl 13 is not rotated in the counter-clockwise direction as seen with reference to FIG. 2 by the urging force of the spring 19.

The operation of the locking mechanism 1 of the present invention is as follows. FIG. 5 shows the unlatched condition of the locking mechanism 1 in which the latch 12 is in the opening position so that the latch 12 is disengaged from the striker 14. The end portion of the seat cushion S is thus free from the striker 14 so that the seat cushion S is able to rotate for being positioned in the storage state.

Figure 6:
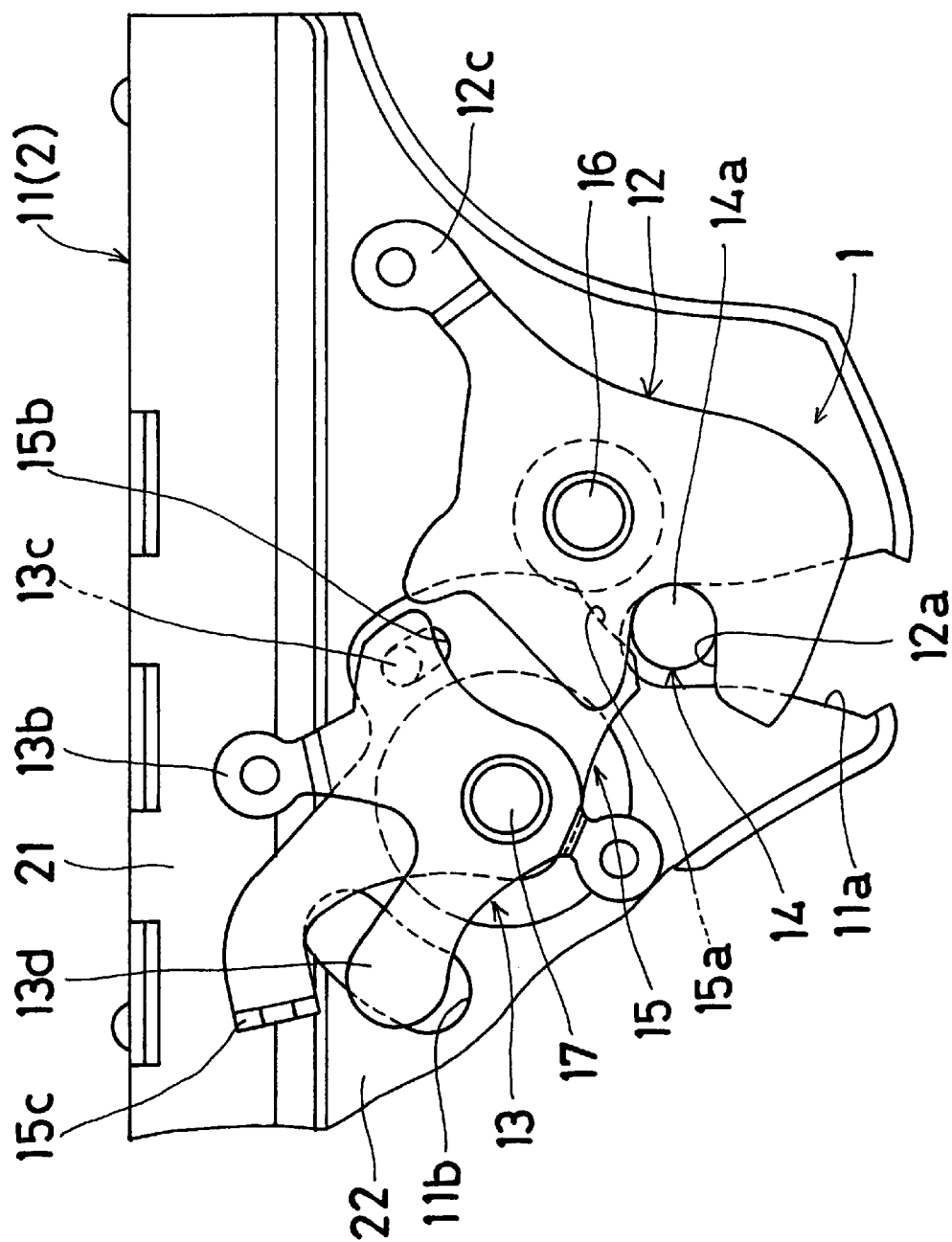
FIG. 6 is a front view of the locking mechanism similar to FIGS. 2 and 5, but showing a different operating condition of the locking mechanism.
Figure 7:
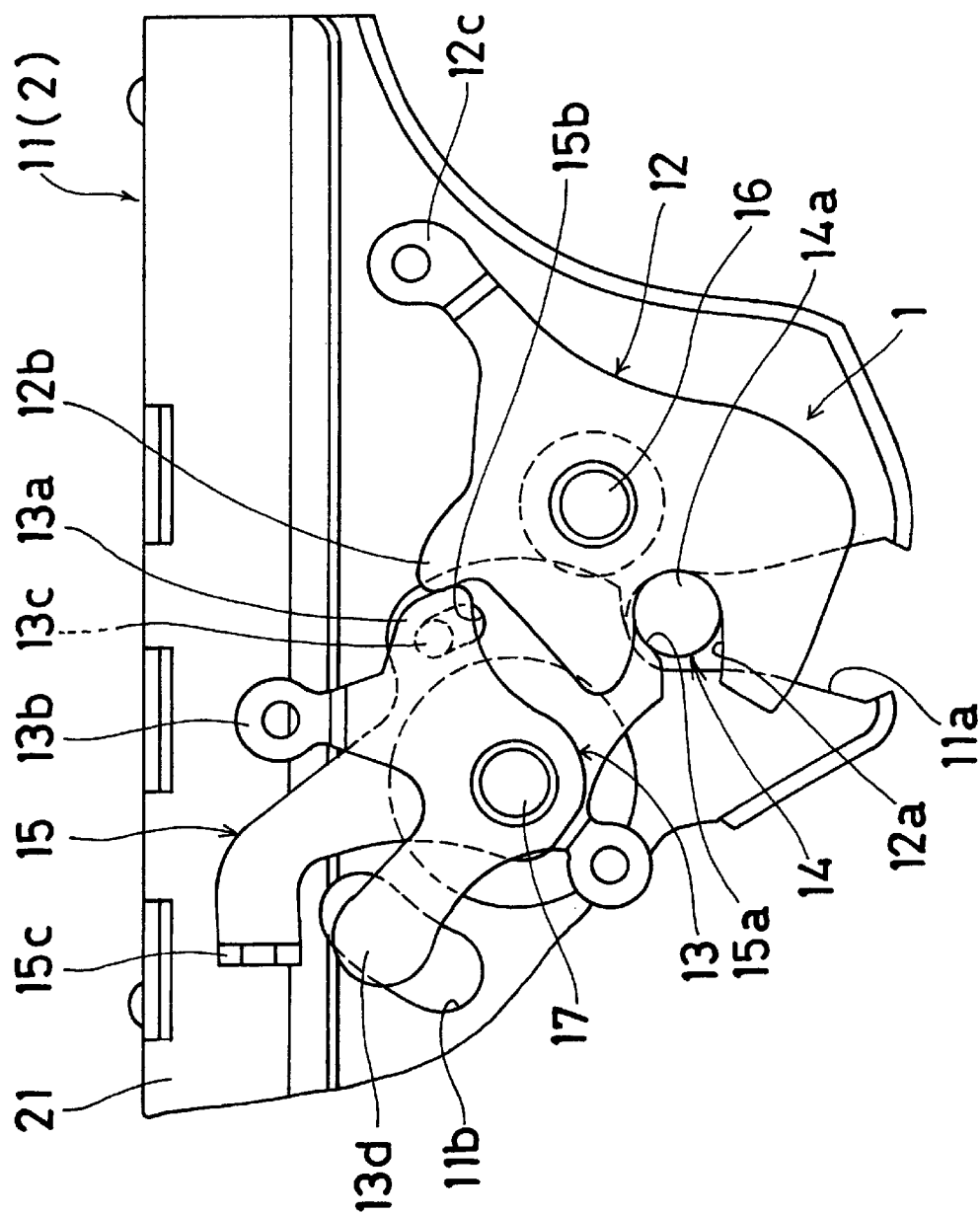
FIG. 7 is another front view of the locking mechanism similar to FIGS. 2 and 5, but showing a different operating condition of the locking mechanism.

When the seat cushion S is rotated to place the end portion of the seat cushion S close to the floor F from the above unlatched condition, the horizontal portion 14a of the striker 14 is received in the U-shaped groove 11a of the base plate 11 and is engaged with the U-shaped groove 12a of the latch 12. The engagement between the striker 14 and the latch 12 rotates the latch 12 in the clockwise direction of FIG. 5 against the urging force of the spring 18. Accordingly, as shown in FIG. 6, the latch 12 moves to a position in which the engaging portion 12b of the latch 12 engages the engaging portion 13a of the pawl 13. During the engagement between the engaging portion 12b of the latch 12 and the engaging portion 13a of the pawl 13 as shown in FIG. 7, the pawl 13 restricts the latch 12 from rotating in the counter-clockwise direction of FIG. 7 against the urging force of the spring 18. As a result, the latch 12 engages the striker 14 and is restricted from rotating by the engagement between the engaging portion 12b of the latch 12 and the engaging portion 13a of the pawl 13 as shown in FIG. 2 so that the end portion of the seat cushion S is held to the floor F in the sitting state of the seat cushion S.

When the pawl 13 is rotated to engage the latch 12, the end portion of the slit 15b of the cam plate 15 is contacted by the connecting pin 13c of the pawl 13 so that the cam plate 15 integrally rotates with the pawl 13. Therefore, as shown in FIG. 7, the cam surface 15a of the cam plate 15 contacts the horizontal portion 14a of the striker 14. After the engaging portion 13a of the pawl 13 engages the engaging portion 12b, the spring 19 urges the cam plate 15 to rotate in the clockwise direction of FIG. 7. As a result, the cam surface 15a of the cam plate 15 pushes the horizontal portion 14a of the striker 14 to cause the latch 12 to rotate in the counter-clockwise direction of FIG. 2. By rotation of the latch 12, the cam surface 15a of the cam plate 15 pinches the horizontal portion 14a of the striker 14 together with the U-shaped groove 12a of the latch 12, and causes complete engagement between the engaging portion 13a of the pawl 13 and the engaging portion 12b of the latch 12. The cam surface 15a contacts the horizontal portion 14a of the striker 14 in a direction perpendicular to a line extending between the axial centers of the horizontal portion 14a of the striker 14 and the latch pin 16.

On the other hand, if the cam plate 15 is rotated in the counter-clockwise direction of FIG. 2 against the urging force of the spring 18 in the engagement condition of the locking mechanism as shown in FIG. 2, the end portion of the slit 15b of the cam plate 15 and the connecting pin 13c of the pawl 13 contact one another to create a gap between the cam surface 15a of the cam plate 15 and the horizontal portion 14a of the striker 14. The cam plate 15, which is operatively connected with the pawl 13 by virtue of the engagement of the end portion of the slit 15b in the cam plate 15 with the connecting pin 13c of the pawl 13, further rotates in the same direction such that the engaging portion 13a of the pawl 13 disengages from the engaging portion 12b of the latch 12. Since there is the gap between the cam surface 15a and the horizontal portion 14a, the engagement force between the connecting portion 13a and the connecting portion 12b is small such that the pawl 13 can be rotated smoothly. As a result, the latch 12 is rotated in the counter-clockwise direction of FIG. 5 by the urging force of the spring 18 so that the horizontal portion 14a of the striker 14 can be disengaged from the U-shaped groove 12a of the latch 12.

In the above described embodiment, the rotation of the cam plate 15 causes the latch 12 to disengage from the horizontal portion 14a through the rotation of the pawl 13. However, it is also possible to construct the locking mechanism so that the rotation of the pawl 13 causes the latch 12 to be disengaged from the horizontal portion 14a.

One way of effecting disengagement of the locking mechanism is through operation of an operating handle 20 which is generally shown in FIG. 2. This operating handle 20 is rotatably mounted on the latch pin 16 and is connected to the arm pin 13d.

The present invention thus provides a locking mechanism which is not susceptible to difficulties associated with significant play in the locking mechanism because of the way in which the cam plate presses against the striker and pinches the striker together with the latch.

The principles, a preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vehicle seat provided with a seat locking mechanism for locking and unlocking a seat cushion with respect to a floor of the vehicle, comprising:

a base plate secured on the seat cushion;

a striker secured to the fixed member;

a latch rotatably supported on the base plate to engage the striker, the latch including an engaging portion;

a pawl rotatably supported on the base plate, the pawl including an engaging portion adapted to engage the engaging portion of the latch to maintain engagement between the striker and the latch to effect a locked condition of the locking mechanism;

a cam member rotatably supported on the base plate to pinch the striker together with the latch in the locked condition of the locking mechanism; and a first spring connected to the pawl and the cam member for applying an urging force to the cam member causing the cam member to rotate in a direction in which the cam member pinches the striker together with the latch.

2. The vehicle seat according to claim 1, wherein the cam member includes a cam surface which contacts the striker under the urging force of the first spring.

3. The vehicle seat according to claim 2, including a latch pin which supports the latch on the base plate, and said cam surface contacting the striker in a direction substantially perpendicular to a line extending between an axial center of the striker and an axial center of the latch pin.

4. The vehicle seat according to claim 1, including a second spring connected to the latch and the pawl for applying an urging force that is larger than the urging force of the first spring.

5. The vehicle seat according to claim 1, including a pawl pin which supports both the pawl and the cam member on the base plate.

6. A vehicle seat provided with a seat locking mechanism for locking and unlocking a seat cushion with respect to a floor of the vehicle, comprising:

a base plate secured on the seat cushion;

a striker secured to the fixed member;

a latch rotatably supported on the base plate to engage the striker, the latch including an engaging portion;

a pawl rotatably supported on the base plate, the pawl including an engaging portion adapted to engage the engaging portion of the latch to maintain engagement between the striker and the latch to effect a locked condition of the locking mechanism; and a cam member rotatably supported on the base plate to pinch the striker together with the latch in the locked condition of the locking mechanism, the pawl including a connecting pin that is positioned in a slot provided in the cam plate.

7. A locking mechanism used in a vehicle for locking and unlocking a movable member with respect to a fixed member, comprising:

a base plate secured on the movable member;

a striker secured on the fixed member;

a latch rotatably supported on the base plate to engage with the striker;

a pawl rotatably supported on the base plate to keep the engagement between the striker and the latch;

a cam member rotatably supported on the base plate to pinch the striker together with the latch; and a first spring disposed between the pawl and the cam member, and urging the cam member toward the striker.

8. A locking mechanism of vehicles for holding a movable member to a fixed member in claim 7, wherein the cam member has a cam surface which contacts with the striker by the first spring.

9. A locking mechanism of vehicles for holding a movable member to a fixed member in claim 8, further comprising a latch pin which supports the latch on the base plate, wherein the cam surface is contacted with the striker in the direction being perpendicular to a line which connects between the axial centers of the striker and the latch pin.

10. A locking mechanism of vehicles for holding a movable member to a fixed member in claim 7, further comprising a second spring disposed between the latch and the pawl, wherein the urging force of the second spring is larger than that of the first spring.

11. A locking mechanism of vehicles for holding a movable member to a fixed member in claim 7, further comprising a pawl pin which supports both the pawl and the cam member on the base plate.

12. The vehicle seat according to claim 6, including a first spring connected to the pawl and the cam member for applying an urging force to the cam member causing the cam member to rotate in a direction in which the cam member pinches the striker together with the latch.

13. The vehicle seat according to claim 12, wherein the cam member includes a cam surface which contacts the striker under the urging force of the first spring.

14. The vehicle seat according to claim 13, including a latch pin which supports the latch on the base plate, and said cam surface contacting the striker in a direction substantially perpendicular to a line extending between an axial center of the striker and an axial center of the latch pin.

15. The vehicle seat according to claim 12, including a second spring connected to the latch and the pawl for applying an urging force that is larger than the urging force of the first spring.

16. The vehicle seat according to claim 6, including a pawl pin which supports both the pawl and the cam member on the base plate.

\* \* \* \* \*